US012779446B2

(12) United States Patent
Hong et al.

(10) Patent No.: US 12,779,446 B2
(45) Date of Patent: Nov. 3, 2026

(54) METHOD OF RECOVERING AND REGENERATING A METAL CATALYST IN ADIPIC ACID PRODUCTION PROCESS

(71) Applicants: Hyundai Motor Company, Seoul (KR); Kia Corporation, Seoul (KR); Korea Research Institute of Chemical Technology, Daejeon (KR)

(72) Inventors: Chae Hwan Hong, Seoul (KR); Hyeon Gook Kim, Daejeon (KR)

(73) Assignees: Hyundai Motor Company, Seoul (KR); Kia Corporation, Seoul (KR); Korea Research Institute of Chemical Technology, Daejeon (KR)

( * ) Notice: Subject to any disclaimer, the term of this patent is extended or adjusted under 35 U.S.C. 154(b) by 762 days.

(21) Appl. No.: 18/118,509

(22) Filed: Mar. 7, 2023

(65) Prior Publication Data

US 2024/0075468 A1 Mar. 7, 2024

(30) Foreign Application Priority Data

Sep. 7, 2022 (KR) ........................ 10-2022-0113327

(51) Int. Cl.

| | |
|---|---|
| ***B01J 23/36*** | (2006.01) |
| ***B01J 6/00*** | (2006.01) |
| ***B01J 23/44*** | (2006.01) |
| ***B01J 23/92*** | (2006.01) |
| ***B01J 23/96*** | (2006.01) |
| ***B01J 38/02*** | (2006.01) |
| ***B01J 38/62*** | (2006.01) |
| ***B01J 38/64*** | (2006.01) |
| ***B01J 38/68*** | (2006.01) |

(52) U.S. Cl.

CPC ............... *B01J 38/62* (2013.01); *B01J 6/001* (2013.01); *B01J 23/36* (2013.01); *B01J 23/44* (2013.01); *B01J 23/92* (2013.01); *B01J 23/96* (2013.01); *B01J 38/02* (2013.01); *B01J 38/64* (2013.01); *B01J 38/68* (2013.01)

(58) Field of Classification Search

CPC ... B01J 38/02; B01J 38/48; B01J 38/68; B01J 23/36; B01J 23/44; B01J 23/92; B01J 23/96; C07C 55/14

See application file for complete search history.

(56) References Cited

U.S. PATENT DOCUMENTS 6,235,932 B1 5/2001 Mall et al.
6,433,220 B1 8/2002 Dudgeon et al.
(Continued)

FOREIGN PATENT DOCUMENTS

CN 102803195 A 11/2012
CN 108855087 A * 11/2018 ........... B01J 37/088
(Continued)

OTHER PUBLICATIONS

Machine translation of RU-2715245, Feb. 26, 2020.*
(Continued)

*Primary Examiner* — Jun Li
(74) *Attorney, Agent, or Firm* — Fox Rothschild LLP

(57) ABSTRACT

Disclosed is a method of recovering a metal catalyst during production of an adipic acid from glucose. The method of recovering and the metal catalyst may provide economic feasibility of the adipic acid production process.

12 Claims, 1 Drawing Sheet

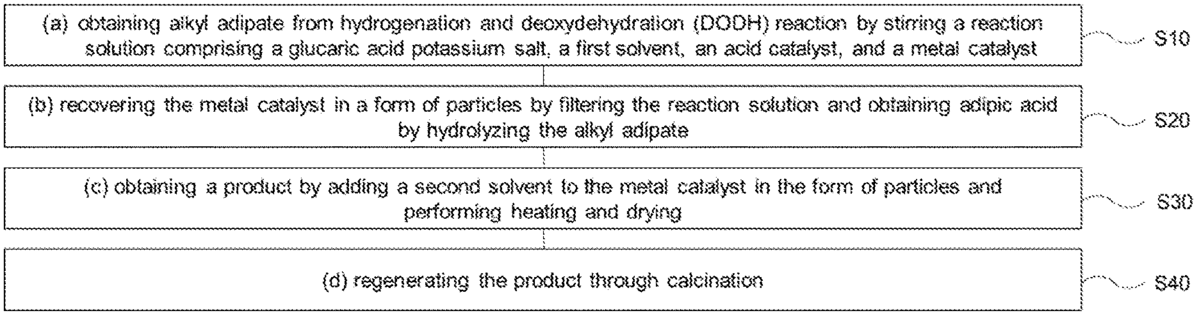

(56) References Cited

U.S. PATENT DOCUMENTS

| | | | | |
|---|---|---|---|---|
| 10,414,710 | B1 | 9/2019 | Hong | |
| 2011/0008238 | A1* | 1/2011 | Radius | B01J 38/02 502/56 |
| 2016/0200646 | A1* | 7/2016 | Murphy | B01J 23/6527 568/864 |
| 2016/0311746 | A1* | 10/2016 | Pinkos | C07C 51/36 |
| 2020/0061598 | A1* | 2/2020 | Vardon | B01J 21/02 |

FOREIGN PATENT DOCUMENTS

| | | | | |
|---|---|---|---|---|
| CN | 107556186 | B | 6/2019 | |
| EP | 3782976 | A1 * | 2/2021 | C07C 67/08 |
| KR | 2001-0034546 | A | 4/2001 | |
| KR | 2003-0012426 | A | 2/2003 | |
| KR | 20200024577 | A | 3/2020 | |
| KR | 20200025040 | A | 3/2020 | |
| RU | 2715245 | C1 * | 2/2020 | C07C 51/377 |

OTHER PUBLICATIONS

Machine translation of CN-108855087, Nov. 23, 2018.*
Angew. Chem. Int. Ed. 2021, 60, 4712 -4719.
ChemSusChem 2022, 15, e202101531.
Moon, T. S. et al. (2009) Appl. Environ. Microbiol. 75: 589-595.
Deng et al., "Efficient Catalysts for the Green Synthesis of Adipic Acid from Biomass." pp. 4712-4719 published in Angewandte Chemie International Edition, Dec. 23, 2020.
Yamaguchi et al., "Deoxydehydration of Biomass-Derived Polyols Over SilverModified Ceria-Supported Rhenium Catalyst with Molecular Hydrogen" pp. 1-8, published in ChemSusChem, Mar. 9, 2022.
Wang et al., "One-pot Catalytic Selective Synthesis of 1,4-Butanediol from 1,4-Anhydroerythritol and Hydrogen," pp. 1-35, published in GreenChemistry, Apr. 17, 2018.

* cited by examiner

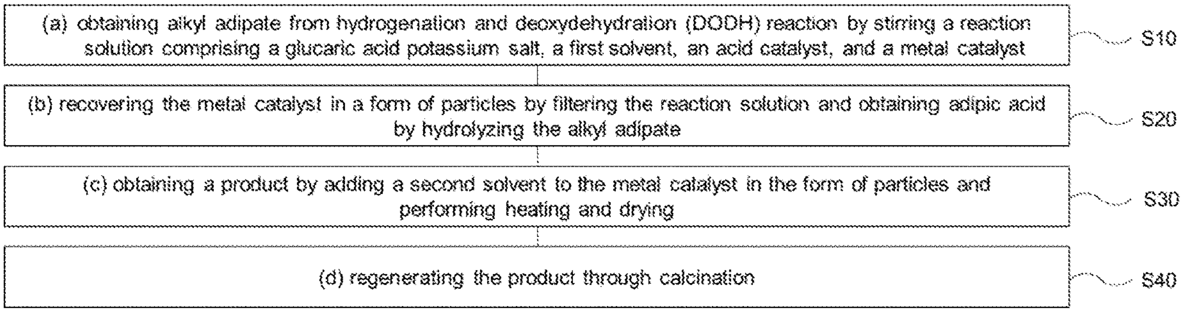
(a) obtaining alkyl adipate from hydrogenation and deoxydehydration (DODH) reaction by stirring a reaction solution comprising a glucaric acid potassium salt, a first solvent, an acid catalyst, and a metal catalyst
S10
(b) recovering the metal catalyst in a form of particles by filtering the reaction solution and obtaining adipic acid by hydrolyzing the alkyl adipate
S20
(c) obtaining a product by adding a second solvent to the metal catalyst in the form of particles and performing heating and drying
S30
(d) regenerating the product through calcination
S40

METHOD OF RECOVERING AND REGENERATING A METAL CATALYST IN ADIPIC ACID PRODUCTION PROCESS

CROSS-REFERENCE TO RELATED APPLICATION

This application claims, under 35 U.S.C. § 119(a), the benefit of priority from Korean Patent Application No. 10-2022-0113327, filed on Sep. 7, 2022, the entire contents of which are incorporated herein by reference.

TECHNICAL FIELD

The present disclosure relates to a method of recovering and regenerating a metal catalyst during production of an adipic acid.

BACKGROUND

Materials for interior and exterior injection-molded parts currently used in automobiles include polypropylene, nylon, polycarbonate, acrylonitrile butadiene styrene (ABS), and the like. Among other things, polypropylene is used in about 15 kg per automobile. Therefore, when this highly versatile nylon production technology is advanced based on biomass, a significant carbon emission reduction effect may be expected.

Among various nylon materials, nylon 66, which is a representative nylon material in addition to nylon 6, has been in high demand due to excellent properties thereof, but production thereof using biomass as a raw material has not yet been established. Therefore, development of a process for producing bio-nylon 66 may be expected to have a great spillover effect not only economically but also environmentally.

Nylon 66 also has excellent heat resistance, wear resistance, and chemical resistance, and is thus used for parts requiring high-temperature characteristics among automobile parts and is the second most used after nylon 6. Nylon 66 is formed by dehydration polymerization of hexamethylenediamine and adipic acid. Here, the adipic acid monomer is currently produced through a chemical synthesis process using cyclohexanone that is obtained as an intermediate from benzene during crude oil refinement, starting from crude oil.

However, this technology and production process have problems such as oil price instability, use of toxic benzene, generation of environmental pollution byproducts including NOR, and the like, and thus it is necessary to develop alternative eco-friendly bioprocessing technology. Therefore, the production of nylon using the bio-process is capable of both decreasing raw material dependence on petroleum and lowering the generation of environmental pollutants and carbon emission.

In the development of the bio-process for nylon 66, technology for synthesizing adipic acid, which is the raw material monomer of nylon 66, from biomass may be the most important process. Recently, a method of producing D-glucaric acid derived from green algae has been reported. Particularly, the method includes using a recombinant microorganism into which a D-glucaric acid production gene, for example, by drying and pulverizing crude green algae, producing a monosaccharide by hydrolyzing the green algae powder with an acid catalyst, and converting the produced monosaccharide into D-glucaric acid through fermentation of a recombinant microorganism into which the D-glucaric acid production gene is introduced, and is known to be a novel fermentation process for producing chemical products having high industrial value from green algae resources that were not conventionally industrially used. However, this method has a disadvantage in that the process is very complicated because of saccharification technology for producing a monosaccharide from crude green algae and metabolic engineering technology for producing glucaric acid using a recombinant microorganism.

SUMMARY

In preferred aspects, provided herein, inter alia, are recovering and regenerating a metal catalyst containing two or more metal components during an adipic acid production process, which is environmentally friendly and is effective at reducing the overall processing cost.

The objects of the present disclosure are not limited to the foregoing. The objects of the present disclosure will be able to be clearly understood through the following description and to be realized by the means described in the claims and combinations thereof.

In an aspect, provided is method of recovering a metal catalyst during production of an adipic acid. The method includes (a) obtaining alkyl adipate from hydrogenation and deoxydehydration (DODH) reaction by stirring a reaction solution including a glucaric acid potassium salt, a first solvent, an acid catalyst, and a metal catalyst, (b) recovering the metal catalyst in the form of particles by filtering the reaction solution and obtaining adipic acid by hydrolyzing the alkyl adipate, (c) obtaining a product by adding a second solvent to the metal catalyst in the form of particles and performing heating and drying, and (d) regenerating the product through calcination.

The glucaric acid potassium salt may be obtained by mixing and reacting glucose, nitric acid, sodium nitrite, and potassium hydroxide.

The first solvent may include methanol, ethanol, or combinations thereof.

The acid catalyst may include one or more selected from the group consisting of Amberlyst 15, 2,4-dinitro sulfonic acid, sulfuric acid, benzenesulfonic acid, trifluoromethanesulfonic acid, and p-toluenesulfonic acid.

The metal catalyst may include a support and two or more metal components.

The support may include activated carbon.

The two or more metal components may include a rhenium (Re) component and a palladium (Pd) component.

The rhenium component may include one or more selected from the group consisting of rhenium oxide, a compound having a formula of $L_xReO_y$ wherein L is amine, halogen, phenylsilyl, phosphine, alkoxy having 1 to 10 carbon atoms, alkyl having 1 to 10 carbon atoms, or COOR wherein R is an alkyl having 1 to 10 carbon atoms, and x and y are each independently an integer of 1 to 3, x+y=4, or combinations thereof.

The metal catalyst may include, based on a total of 100 wt % of the metal catalyst, an amount of 85 wt % to 95 wt % of the support and an amount of 5 wt % to 15 wt % of the two or more metal components.

Step (b) may include (b-1) separating the acid catalyst using a sieve having a mesh size of 150 μm to 200 (b-2) separating the metal catalyst in the form of particles using a filter having a unit pore size of 0.1 μm to 1.0 and (b-3) obtaining adipic acid by mixing the alkyl adipate with an acid solution and performing a hydrolysis reaction.

Step (c) may include (c-1) obtaining a mixture including the metal catalyst in the form of particles with a second solvent at a temperature of 15° C. to 25° C., (c-2) obtaining a product by heating the mixture at a temperature of about 80° C. to 120° C. and maintaining the mixture for 3 hours to 5 hours, and (c-3) obtaining a result by drying the product at a temperature of 100° C. to 120° C. for 12 hours to 16 hours.

The second solvent may include a distilled water.

Step (d) may include (d-1) regenerating the result through calcination at a temperature of 400° C. to 430° C. in a nitrogen gas atmosphere for 3 hours to 5 hours.

BRIEF DESCRIPTION OF THE DRAWING

FIG. 1 shows an exemplary method of recovering and regenerating a metal catalyst in an adipic acid production process according to an exemplary embodiment of the present disclosure.

DETAILED DESCRIPTION

The above and other objects, features and advantages of the present disclosure will be more clearly understood from the following preferred embodiments taken in conjunction with the accompanying drawing. However, the present disclosure is not limited to the embodiments disclosed herein, and may be modified into different forms. These embodiments are provided to thoroughly explain the disclosure and to sufficiently transfer the spirit of the present disclosure to those skilled in the art.

Throughout the drawing, the same reference numerals will refer to the same or like elements. For the sake of clarity of the present disclosure, the dimensions of structures are depicted as being larger than the actual sizes thereof. It will be understood that, although terms such as "first", "second", etc. may be used herein to describe various elements, these elements are not to be limited by these terms. These terms are only used to distinguish one element from another element. For instance, a "first" element discussed below could be termed a "second" element without departing from the scope of the present disclosure. Similarly, the "second" element could also be termed a "first" element. As used herein, the singular forms are intended to include the plural forms as well, unless the context clearly indicates otherwise.

It will be further understood that the terms "comprise", "include", "have", etc., when used in this specification, specify the presence of stated features, integers, steps, operations, elements, components, or combinations thereof, but do not preclude the presence or addition of one or more other features, integers, steps, operations, elements, components, or combinations thereof. Also, it will be understood that when an element such as a layer, film, area, or sheet is referred to as being "on" another element, it may be directly on the other element, or intervening elements may be present therebetween. Similarly, when an element such as a layer, film, area, or sheet is referred to as being "under" another element, it may be directly under the other element, or intervening elements may be present therebetween.

Unless otherwise specified, all numbers, values, and/or representations that express the amounts of components, reaction conditions, polymer compositions, and mixtures used herein are to be taken as approximations including various uncertainties affecting measurement that inherently occur in obtaining these values, among others, and thus should be understood to be modified by the term "about" in all cases. Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Furthermore, when a numerical range is disclosed in this specification, the range is continuous, and includes all values from the minimum value of said range to the maximum value thereof, unless otherwise indicated. Moreover, when such a range pertains to integer values, all integers including the minimum value to the maximum value are included, unless otherwise indicated. In the present specification, when a range is described for a variable, it will be understood that the variable includes all values including the end points described within the stated range. For example, the range of "5 to 10" will be understood to include any subranges, such as 6 to 10, 7 to 10, 6 to 9, 7 to 9, and the like, as well as individual values of 5, 6, 7, 8, 9 and 10, and will also be understood to include any value between valid integers within the stated range, such as 5.5, 6.5, 7.5, 5.5 to 8.5, 6.5 to 9, and the like. Also, for example, the range of "10% to 30%" will be understood to include subranges, such as 10% to 15%, 12% to 18%, 20% to 30%, etc., as well as all integers including values of 10%, 11%, 12%, 13% and the like up to 30%, and will also be understood to include any value between valid integers within the stated range, such as 10.5%, 15.5%, 25.5%, and the like.

FIG. 1 shows an exemplary method of recovering and regenerating a metal catalyst in an adipic acid production process according to the present disclosure. Hereinafter, the present disclosure will be described in more detail with reference to the accompanying drawing.

As shown in FIG. 1, the method of recovering and regenerating a metal catalyst during the production of the adipic acid includes (a) obtaining alkyl adipate from hydrogenation and deoxydehydration (DODH) reactions by stirring a reaction solution including a glucaric acid potassium salt, a first solvent, an acid catalyst, and a metal catalyst, (b) recovering the metal catalyst in the form of particles by filtering the reaction solution and obtaining adipic acid by hydrolyzing the alkyl adipate (S20), (c) obtaining a product by adding a second solvent to the metal catalyst in the form of particles and performing heating and drying (S30), and (d) regenerating the product through calcination (S40).

S10 is a step of (a) obtaining alkyl adipate by subjecting a reaction solution including a glucaric acid potassium salt, a first solvent, an acid catalyst, and a metal catalyst to hydrogenation and deoxydehydration (DODH) with stirring.

A method of preparing the glucaric acid potassium salt is not limited, but may include mixing and reacting glucose, nitric acid, sodium nitrite, and potassium hydroxide, which is the general synthesis method. Accordingly, the starting material of the present disclosure may be glucose.

For example, a glucaric acid potassium salt may be prepared through a nitric acid oxidation reaction, and the molar ratio of glucose to nitric acid may be 1:2.5-3.6. Through potassium hydroxide (KOH) treatment after oxidation, a glucaric acid potassium salt may be obtained.

The first solvent may include methanol, ethanol, or combinations thereof.

The acid catalyst may act on the hydroxyl group of the glucaric acid potassium salt to promote a dehydration reaction. The acid catalyst may include one or more selected from the group consisting of Amberlyst 15, 2,4-dinitrosulfonic acid, sulfuric acid, benzenesulfonic acid, trifluoromethanesulfonic acid, and p-toluenesulfonic acid, and is preferably Amberlyst-15.

The metal catalyst may include a support and two or more metal components.

The metal catalyst may include, as a precursor, activated carbon, palladium(II) nitrate dihydrate ($N_7O_8Pd\ 2H_2O$), and potassium perrhenate ($KReO_4$).

The support may include activated carbon.

The two or more metal components may include a rhenium component and a palladium component.

The rhenium may include at least one selected from the group consisting of rhenium oxide and LxReOy (in which L is amine, halogen, phenylsilyl, phosphine, alkoxy having 1 to 10 carbon atoms, alkyl having 1 to 10 carbon atoms, or COOR (in which R is an alkyl having 1 to 10 carbon atoms), and x and y are each independently an integer of 1 to 3, x+y=4).

The metal catalyst may include, based on a total of 100 wt % of the metal catalyst, an amount of 85 wt % to 95 wt % of the support and an amount of 5 wt % to 15 wt % of the metal. When the amounts thereof fall out of the above ranges, there may occur problems such as lowered catalytic activity and reduced economic feasibility such as material cost for catalyst preparation.

The weight ratio of the glucaric acid potassium salt to the metal catalyst may be 5:3.5 to 4.5. When the weight ratio of the metal catalyst is less than 3.5 or is greater than 4.5, synthesis of the alkyl adipate pursued in the present disclosure may not proceed efficiently.

S20 is a step of (b) recovering the metal catalyst in the form of particles by filtering the reaction solution and obtaining adipic acid by hydrolyzing the alkyl adipate.

S20 may include (b-1) separating the acid catalyst using a sieve having a mesh size of 150 μm to 200 μm, (b-2) separating the metal catalyst in the form of particles using a filter having a unit pore size of 0.1 μm to 1.0 μm, and (b-3) obtaining adipic acid by mixing the alkyl adipate with an acid solution and performing a hydrolysis reaction.

A sieve having a mesh size of 150 μm to 200 μm in step (b-1) may be used. When the mesh size is less than 150 μm, the target material may not be completely separated but may remain. On the other hand, when the mesh size is greater than 200 μm, materials in addition to the target material may also be filtered, and thus separation is not achieved.

A filter having a unit pore size of 0.1 μm to 1.0 μm in step (b-2) may be used. Examples of the filter may include a paper filter and a PTFE membrane filter. The unit pore size of the filter may be preferably 0.3 μm to 0.5 μm. When the unit pore size of the filter is less than 0.1 μm, separation of the metal catalyst may not be complete. In contrast, when the unit pore size of the filter is greater than 1.0 μm, separation of the metal catalyst may not be complete and loss in the separation process may occur.

The metal catalyst may be added to the solvent and thus participates in chemical reactions such as hydrogenation and deoxydehydration. The metal catalyst may precipitate in the solvent in a liquid phase after termination of the chemical reactions.

In the case in which the metal catalyst is separated and recovered after the hydrolysis reaction using the acid solution in step (b-3), the acid solution, the rhenium metal, and the palladium metal may be chemically or ionically bound or complexed with each other. Thereby, the electronic state of the metal particles may be changed, and also weak ionic properties may appear. Since the rhenium or palladium metal having such ionic properties may be leached in a solvent solution, it is impossible to completely normally recover and reuse the metal. Hence, the present disclosure is capable of overcoming this problem by recovering the metal catalyst particles after hydrogenation and deoxydehydration.

Step (b-3) is obtaining adipic acid by mixing the alkyl adipate with an acid solution and performing a hydrolysis reaction.

Adipic acid may be obtained through a hydrolysis reaction of removing only the alkyl group from alkyl adipate, and may be specifically obtained through acid treatment of alkyl adipate.

The acid solution may be hydrochloric acid, and the concentration of the acid solution may be N to 5 N.

The weight ratio of the alkyl adipate to the acid solution may be 1:5.5-6.5.

S20 may be performed at a temperature of 50° C. to 100° C.

S30 may be a step of (c) obtaining a result by adding a second solvent to the metal catalyst in the form of particles and performing heating and drying.

S30 may include (c-1) obtaining a mixture by mixing the metal catalyst in the form of particles with the second solvent at a temperature of about 15° C. to 25° C., (c-2) obtaining a product by heating the mixture at a temperature of about 80° C. to 120° C. and maintaining the same for 3 hours to 5 hours, and (c-3) obtaining a result by drying the product at a temperature of 100° C. to 120° C. for 12 hours to 16 hours.

The second solvent in step (c-1) may include secondary distilled water.

The secondary distilled water may be prepared through an electric ion exchange process and an ultraviolet sterilization/photooxidation process immediately after forming primary purified water using a reverse osmosis membrane.

Between steps (c-2) and (c-3), the second solvent may be removed using a vacuum evaporator. Thereafter, the remaining particles may be dried in step (c-3).

When the temperature and time conditions in S30 fall out of the above ranges, even when the metal catalyst is regenerated, the activity thereof may be lowered.

S40 is a step of (d) regenerating the product through calcination.

S40 may include (d-1) regenerating the product through calcination in a nitrogen gas atmosphere at a temperature of 400° C. to 430° C. for 3 hours to 5 hours.

When the temperature and time conditions in step (d-1) fall out of the above ranges, even when the metal catalyst is regenerated, the activity thereof may be reduced.

EXAMPLE

A better understanding of the present disclosure may be obtained through the following examples and comparative examples. However, these examples are not to be construed as limiting the technical spirit of the present disclosure.

Examples 1 to 4

Examples 1 to 4 were prepared using components in the amounts shown in Table 1 below. As described above, a reaction solution including a glucaric acid potassium salt, an acid catalyst, a metal catalyst, and a first solvent according to the conditions shown in (A) of Table 1 below was subjected to hydrogenation and deoxydehydration with stirring to obtain alkyl adipate, which was then hydrolyzed, thereby yielding adipic acid.

During this process, the metal catalyst in the form of particles was recovered by filtering the reaction solution under the conditions shown in (B) and (C) of Table 1 below, the second solvent was added to the metal catalyst in the form of particles under the conditions shown in (D) of Table 1 below, and heating and drying were performed under the conditions shown in (E) and (F) of Table 1 below to obtain a result, which was then calcined under the conditions shown in (G) of Table 1 below and thus regenerated.

Comparative Examples 1 to 4

Comparative Examples 1 to 4 were prepared in the same manner as in Examples, with the exception that the reaction conditions and components were changed as shown in Table 1 below.

TABLE 1

| | Example | | | | Comparative Example | | | |
|---|---|---|---|---|---|---|---|---|
| Classification | 1 | 2 | 3 | 4 | 1 | 2 | 3 | 4 |
| (A) $1^{st}$ solvent | Methanol | Methanol | Ethanol | Ethanol | Methanol | Methanol | Ethanol | Ethanol |
| (B) Mesh size | 180 μm | 180 μm | 180 μm | 180 μm | 180 μm | 180 μm | 180 μm | 180 μm |
| (C) Unit pore size of filter | 0.45 μm | 0.45 μm | 0.45 μm | 0.45 μm | 0.45 μm | 0.45 μm | 0.45 μm | 0.45 μm |
| (D) Presence or absence of $2^{nd}$ solvent | Addition of secondary distilled water | Addition of secondary distilled water | Addition of secondary distilled water | Addition of secondary distilled water | Not added | Addition of general water | Not added | Addition of primary distilled water |
| (E) Temperature and time conditions in step (c-2) | Heating at 100° C. and maintaining for 3 hours | Heating at 100° C. and maintaining for 4 hours | Heating at 100° C. and maintaining for 4.5 hours | Heating at 100° C. and maintaining for 5 hours | — | Heating at 50° C. and maintaining for 3 hours | — | Heating at 70° C. and maintaining for 3 hours |
| (F) Temperature and time conditions in step (c-3) | Heating at 110° C. and maintaining for 12 hours | Heating at 110° C. and maintaining for 13 hours | Heating at 100° C. and maintaining for 14 hours | Heating at 100° C. and maintaining for 15 hours | Heating at 80° C. and maintaining for 2 hours | Heating at 90° C. and maintaining for 3 hours | Heating at 100° C. and maintaining for 4 hours | Heating at 100° C. and maintaining for 5 hours |
| (G) Temperature and time conditions in step (d-1) | 400° C./3 hours | 410° C./3 hours | 420° C./3 hours | 430° C./3 hours | 230° C./3 hours | 280° C./3 hours | 330° C./3 hours | 380° C./3 hours |

(A) made by Sigma-Aldrich (B) made by Sigma-Aldrich (C) made by Sigma-Aldrich (D) made by Sigma-Aldrich (G) Calcination system name and manufacturer: Model Name VULCAN 3-180 (Manufacturer: NEY)

Test Example 1: Comparison of Yields of Chemical Reactions

In order to prove the effect of the present disclosure described above using the metal catalysts according to Examples and Comparative Examples, the yield of the chemical reaction was evaluated using the metal catalyst. The initial yield obtained using the first synthesized metal catalyst is referred to as "first yield", and the yield of the chemical reaction obtained using the metal catalyst recovered and regenerated by the methods of Examples and Comparative Examples of the present disclosure after the first chemical reaction is referred to as "second yield". The results thereof are shown in Tables 2 and 3 below.

TABLE 2

| Classification | First yield (%) (yield of chemical reaction using first synthesized catalyst) | Second yield (%) (yield after recovery and regeneration of catalyst used for first chemical reaction through method of Examples) |
|---|---|---|
| Example 1 | 83 | 81.3 |
| Example 2 | 83 | 81.2 |
| Example 3 | 83 | 81.5 |
| Example 4 | 83 | 81.5 |

TABLE 3

| Classification | First yield (%) (yield of chemical reaction using first synthesized catalyst) | Second yield (%) (yield after recovery and regeneration of catalyst used for first chemical reaction through method of Comparative Examples) |
|---|---|---|
| Comparative Example 1 | 83 | 35 |
| Comparative Example 2 | 83 | 33 |
| Comparative Example 3 | 83 | 35 |
| Comparative Example 4 | 83 | 31 |

As shown in Table 2, in Examples 1 to 4 according to exemplary embodiments of the present disclosure, the difference between the first yield and the second yield obtained after recovery and regeneration processes fell within 3%.

In contrast, as shown in Table 3, Comparative Examples 1 to 4 exhibited very low yield compared to Examples according to the present disclosure.

Therefore, the method of recovering and regenerating the metal catalyst according to various exemplary embodiments of the present disclosure can provide a very good yield.

As is apparent from the above description, there is provided a method of recovering and regenerating a metal catalyst in an adipic acid production process according to various exemplary embodiments of the present disclosure, in which the adipic acid production process is capable of producing adipic acid from glucose that is a terrestrial resource, unlike a conventional method of producing adipic acid from petrochemicals, and as such, the production process is environmentally friendly, and adipic acid can be produced at low cost through a very simple process compared to conventional petrochemical or biotechnological production methods. Here, the method of recovering and regenerating the metal catalyst, which plays a key role in the adipic acid production process, is capable of improving economic feasibility of the entire production process, resulting in a great industrial spillover effect.

The effects of the present disclosure are not limited to the above-mentioned effects. It should be understood that the effects of the present disclosure include all effects that can be inferred from the description of the present disclosure.

Although exemplary embodiments of the present disclosure have been described with reference to the accompanying drawing, those skilled in the art will appreciate that the present disclosure may be embodied in other specific forms without changing the technical spirit or essential features thereof. Thus, the embodiments described above should be understood to be non-limiting and illustrative in every way.

What is claimed is:

1. A method of recovering a metal catalyst during production of an adipic acid, comprising:

(a) obtaining alkyl adipate from hydrogenation and deoxydehydration (DODH) reaction by stirring a reaction solution comprising a glucaric acid potassium salt, a first solvent, an acid catalyst, and a metal catalyst;

(b) recovering the metal catalyst in a form of particles by filtering the reaction solution and obtaining adipic acid by hydrolyzing the alkyl adipate;

(c) obtaining a product by adding a second solvent to the metal catalyst in the form of particles and performing heating and drying; and (d) regenerating the product through calcination, wherein step (b) comprises:

(b-1) separating the acid catalyst using a sieve having a mesh size of 150 μm to 200 μm;

(b-2) separating the metal catalyst in the form of particles using a filter having a unit pore size of 0.1 μm to 1.0 μm; and (b-3) obtaining adipic acid by mixing the alkyl adipate with an acid solution and performing a hydrolysis reaction.

2. The method of claim 1, wherein the glucaric acid potassium salt is obtained by mixing and reacting glucose, nitric acid, sodium nitrite, and potassium hydroxide.

3. The method of claim 1, wherein the first solvent comprises one or more selected from the group consisting of methanol, ethanol.

4. The method of claim 1, wherein the acid catalyst comprises one or more selected from the group consisting of Amberlyst 15, 2,4-dinitro sulfonic acid, sulfuric acid, benzenesulfonic acid, trifluoromethanesulfonic acid, and p-toluenesulfonic acid.

5. The method of claim 1, wherein the metal catalyst comprises a support and two or more metal components.

6. The method of claim 5, wherein the support comprises activated carbon.

7. The method of claim 5, wherein the two or more metal components comprise a rhenium component and a palladium component.

8. The method of claim 7, wherein rhenium comprises rhenium oxide, a compound having a formula of LxReOy wherein L is amine, halogen, phenylsilyl, phosphine, alkoxy having 1 to 10 carbon atoms, alkyl having 1 to 10 carbon atoms, or COOR wherein R is an alkyl having 1 to 10 carbon atoms, and x and y are each independently an integer of 1 to 3, wherein x+y=4, or combination thereof.

9. The method of claim 5, wherein the metal catalyst comprises, based on a total of 100 wt % of the metal catalyst, an amount of 85 wt % to 95 wt % of the support and an amount of 5 wt % to 15 wt % of the two or more metal components.

10. The method of claim 1, wherein step (c) comprises:

(c-1) obtaining a mixture by mixing the metal catalyst in the form of particles with a second solvent at a temperature of 15° C. to 25° C.;

(c-2) obtaining a product by heating the mixture at a temperature of 80° C. to 120° C. and maintaining the mixture for 3 hours to 5 hours; and (c-3) obtaining a result by drying the product at a temperature of 100° C. to 120° C. for 12 hours to 16 hours.

11. The method of claim 1, wherein the second solvent comprises a distilled water.

12. The method of claim 1, wherein step (d) comprises (d-1) regenerating the product through calcination at a temperature of 400° C. to 430° C. in a nitrogen gas atmosphere for 3 hours to 5 hours.

* * * * *